(12) United States Patent
Cannelli, Jr.

(10) Patent No.: US 6,450,741 B1
(45) Date of Patent: Sep. 17, 2002

(54) APPARATUS FOR DEBURRING, CHAMFERRING AND BEVELING WORKPIECES

(76) Inventor: Victor Cannelli, Jr., 120 Genesse La., Madison, CT (US) 06443

( * ) Notice: Subject to any disclaimer, the term of this patent is extended or adjusted under 35 U.S.C. 154(b) by 63 days.

(21) Appl. No.: 09/650,373

(22) Filed: Aug. 29, 2000

(51) Int. Cl.$^7$ .......................... B23C 3/12; B23C 1/025; B23C 1/06
(52) U.S. Cl. ................ 409/138; 409/229; 409/134; 409/136; 409/137; 144/253.2; 144/135.3; 29/DIG. 86; 451/241; 408/241 G
(58) Field of Search .................... 409/138, 130, 409/125, 229, 228, 134, 137, 136; 144/145.2, 253.4, 253.2, 253.1, 135.2, 135.3; 33/638; 29/DIG. 86; 451/241, 282, 451; 408/241 G (56) References Cited

U.S. PATENT DOCUMENTS

| | | | |
|---|---|---|---|
| 2,059,317 A | * 11/1936 | Davis | 30/293 |
| 2,909,011 A | * 10/1959 | Hendricks et al. | 451/241 |
| 3,080,794 A | * 3/1963 | Grabes | 144/135.3 |
| 3,172,417 A | * 3/1965 | Zulkowitz et al. | 144/134.1 |
| 3,837,383 A | * 9/1974 | Ko | 29/DIG. 86 |
| 4,504,178 A | * 3/1985 | Seidenfaden | 409/138 |
| 5,022,160 A | * 6/1991 | Sharpe et al. | 144/225 |
| 5,507,330 A | * 4/1996 | Chen | 144/253.2 |
| 5,522,684 A | * 6/1996 | Heck | 409/138 |
| 5,564,871 A | * 10/1996 | Lagsdin | 409/138 |
| 5,694,994 A | * 12/1997 | Engler et al. | 144/253.2 |

FOREIGN PATENT DOCUMENTS

| | | | |
|---|---|---|---|
| CH | 666 845 A5 | * 8/1988 | |
| DE | 3237276 A1 | * 5/1983 | |
| WO | WO 93/15864 A1 | * 8/1993 | |

OTHER PUBLICATIONS

Brochure of Simco Industries of Roseville, Michigan, five pages, showing various deburring, chamfering and beveling tools.

* cited by examiner

Primary Examiner—A. L. Wellington
Assistant Examiner—Erica E Cadugan
(74) Attorney, Agent, or Firm—Robert H. Montgomery (57) ABSTRACT

A fixture for use with a rotary cutting tool for deburring, chamferring or beveling a work piece utilized with a drill comprises a member having opposite sides with a recess defined a first of the sides by two surfaces at right angles to each other to define guide surfaces for a work piece. The opposite side resides in a plane essentially perpendicular to a plane bisecting the angle between the surfaces. A semi-cylindrical recess is defined in the member in the opposite side intermediate the ends thereof about an axis which is essentially perpendicular to a plane bisecting the angle between the surfaces. The passage extends through a portion of the surfaces and defines an opening in the surfaces whereby a rectangular cross section work piece contacting the guide surfaces will extend through the opening into the passage. A guard member having a cylindrical upper portion and a semi-cylindrical depending lower portion is affixed to the member essentially coaxial with the passage thereby enclosing the semi-cylindrical recess. The fixture may be clamped to the worktable of a drill press or vertical milling machine and a rotary cutting tool inserted into the cylindrical recess to act on a work piece extending through the opening.

20 Claims, 7 Drawing Sheets

APPARATUS FOR DEBURRING, CHAMFERRING AND BEVELING WORKPIECES

FIELD OF THE INVENTION

This invention relates to fixtures very useful in the finishing of work pieces particularly in deburring and /or chamfering the edges thereof.

BACKGROUND OF THE INVENTION

When a work piece such as a rectangular cross-section piece of wood, plastic or metal is finished by machining a face(s) on a milling machine or surface grinding machine, the resulting corners are very sharp and require deburring by the craftsman or machinist. Bar stock and plate or panel material processed by a mill can also exhibit sharp edges which must be smoothed on the finished product.

Current methods utilized include use of a hand file. This is time consuming and does not always yield a precise edge across a corner. Use of a belt or disk sander, hand held or floor or bench mounted, is less time consuming but, again may not produce accurate results due to the use of the human hand. There is also available bench or table top deburr/chamfer/bevel machines and hand held powered tools with right angle guides especially designed for deburr/chamfer/bevel use. However these powered tools are special purpose, relatively expensive machines.

Accordingly, the present invention provides an inexpensive fixture that permits accurate deburring, chamferring and beveling using an existing tool, normally found in a shop, such as a drill press, router or drum sander.

An object of this invention is to provide a new and improved fixture for use with a rotary cutting or stock removal tool commonly found in a metal working, wood shop or plastic finishing shop.

Another object of this invention is to provide a new, improved and inexpensive fixture, which may be employed with standard or common shop tools for the purpose of deburring, chanferring and/or beveling a work piece.

A further object of this invention is to a new and improved fixture of the type described which is compact in design and readily adaptable to existing tools.

SUMMARY OF THE INVENTION

Briefly stated, the invention, in one form there as utilized with a drill press or other tool having a cutting bit rotatable about a vertical axis comprises a member having opposite sides with a recess defined in a first of the sides by two surfaces at right angles to each other to defining guide surfaces for a work piece. The opposite side resides in a plane essentially perpendicular to a plane bisecting the angle between the surfaces. A semi-cylindrical recess is defined into the member in the opposite side, intermediate the ends thereof, about an axis which is essentially perpendicular to a plane bisecting the angle between the surfaces. The passage extends through a portion of the guide surfaces and defines an opening in the guide surfaces whereby a rectangular cross section work piece contacting the guide surfaces will extend through the opening into the passage. A guard member having a cylindrical upper portion and a semi-cylindrical depending lower portion is affixed to the member essentially coaxial with the passage thereby, enclosing the semi-cylindrical recess and defining with the member a cylindrical recess. The fixture may be clamped to the worktable of a drill press and a rotary cutting tool inserted into the cylindrical recess to act on a work piece extending through the opening.

A fixture embodying the invention may be modified with respect to the foregoing description to accept a cutting tool having a cutting bit rotatable about a horizontal axis. In such modification the fixture is mounted to a vertical support extending from a base support member. The fixture is mounted to the vertical support with the angle of the guide surfaces bisected by a vertical plane. The cutting tool, usually a router designed to be hand held, is mounted to the opposite side of the vertical support. The cutting bit extends through an aperture into the semi-cylindrical recess in the fixture and positioned to act on the corner of a work piece extending through the opening. A hollow member, supported on the base support member is positioned below the semi-cylindrical recess in close proximity to the fixture to catch cut chips, saw dust, etc. and also act as a safety guard about the cutting bit.

In general, a fixture embodying the invention is removeably mounted with respect to the bit of a rotary cutting tool in operative relation thereto to achieve the desired deburring, chamfering or beveling.

The invention is particularly pointed out and distinctly claimed in the concluding portion of this specification. The invention, however, together with further objects and advantages thereof, may best be appreciated by reference to the following detailed descriptions taken in conjunction with the drawings.

DETAILED DESCRIPTIONS OF PREFERRED EMBODIMENTS OF INVENTION

Reference is first made to FIGS. 1 through 4. A fixture 10 embodying the invention includes a body member 11 of aluminum having machined surfaces, coated with polytetrafloroethelene, known generally by the trademark "Teflon". Alternatively, body member may be chrome-plated steel or injection molded fiber filled nylon. A first side has a recess defined by guide surfaces, 12 and 13 which are perpendicular to each other. A notch 14 is defined at the junction of guide surfaces 12 and 13 for clearance to receive the corner of a work piece. The opposite surface S of member 11 of member resides in a plane, vertical as shown in FIGS. 1–4, which is perpendicular to a plane P bisecting the angle between surfaces 12 and 13. A pair of aligned, spaced apart, threaded apertures 12a and 12b are defined through guide surface 12. A pair of aligned, spaced apart apertures 13a and 13b are defined through surface 13. These apertures are for the purpose of receiving bolts to secure and auxiliary guide member to either of guide surfaces 12 or 13, as will hereinafter exemplified. A semi-cylindrical recess 15 is defined in member 11, which intersects a portion of surfaces 12 and 13, and provides an opening O through guide surfaces 12 and 13. As hereinafter described, a corner of a work piece extends through opening O into recess. The recess 15 terminates in a floor 16 and is beveled or countersunk as indicated by the reference numeral 17.

A plurality of threaded apertures 18 extend through the bottom, as shown in FIGS. 1–4, of member 11 for the purpose of securing a clamping bar or plate to member 11, as hereinafter exemplified. Extending through the back surface of member 11 at each of the upper back corners are a pair of threaded openings adapted to receive securing bolts for mounting members (not shown in FIGS. 1–4) in one application of the fixture. Another pair of threaded apertures 21a and 21b are defined through the back of surface of member 11 to receive clamping bolts for a guard member, hereinafter described.

Figure 1:
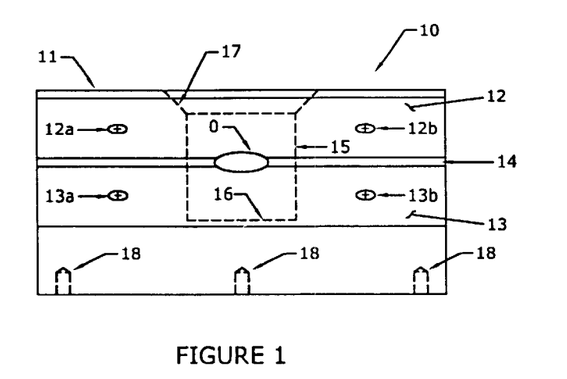
FIG. 1 is an elevation view of what is termed the front side of the fixture.
Figure 2:
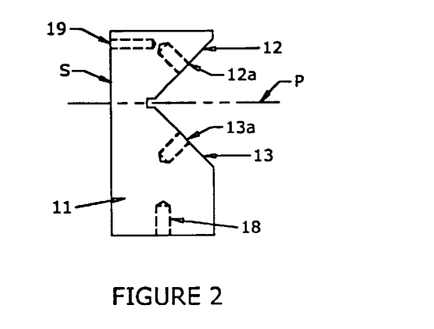
FIG. 2 is an end elevation of the fixture of FIG. 1, seen from the left side of FIG. 1.
Figure 3:
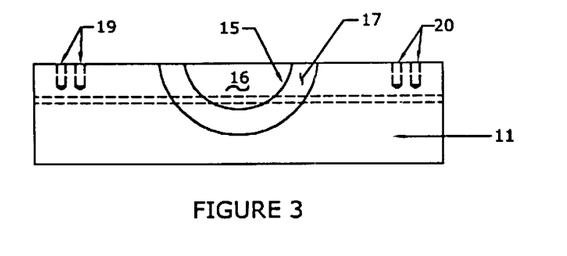
FIG. 3 is a top view of the fixture of FIG. 1.
Figure 4:
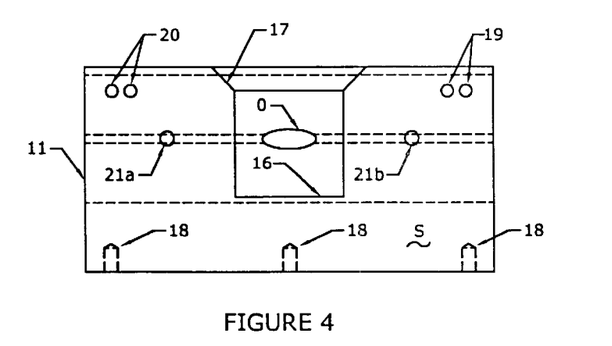
FIG. 4 is a back view of the fixture of FIG. 1.
Figure 5:
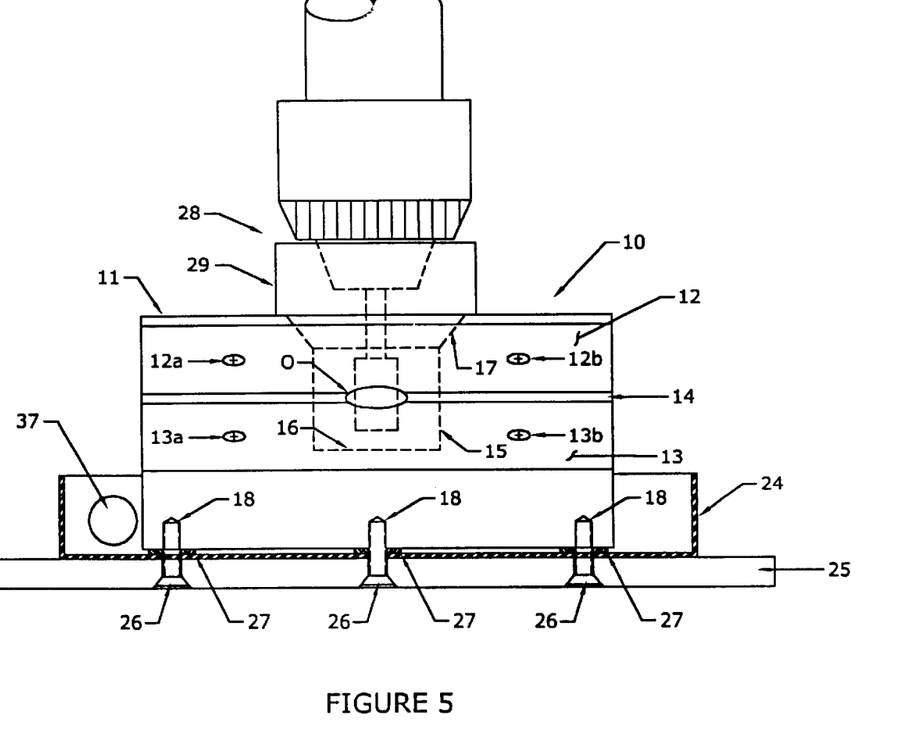
FIG. 5 is an elevation of the fixture of FIG. 1 set up for operation with a power tool with a cutting bit rotatable about a vertical axis.
Figure 6:
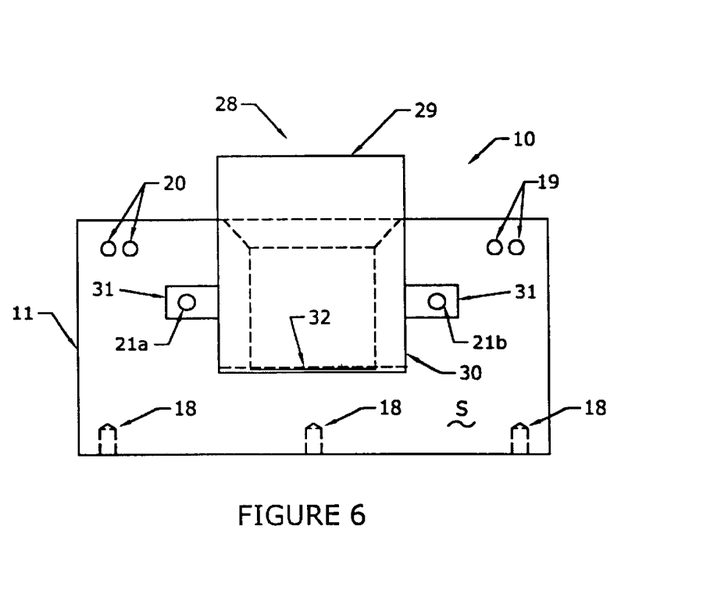
FIG. 6 is a view similar to FIG. 4, showing a guard member mounted to the fixture as shown in FIG. 4

Reference is first made to FIGS. 5 and 6. A fixture embodying the invention is shown set for operation with a power tool, a drill press, having a rotary cutting bit rotatable about a vertical axis. A fixture 10 is set up for metalworking and is secured to a cutting lubricant tray 24, shown in longitudinal half section.. A clamping bar 25 is bolted to member 11 through the bottom of tray by a plurality of flat head bolts 26 threaded into apertures 18. The bolts receive sealing washers 27 thereabout at the bottom of tray 24. The heads of the bolts 26 are flush with the bottom of clamping bar 16 or recessed in the bottom thereof.

As shown in FIG. 6, a guard member 28 having a cylindrical upper portion 29 and a semi-cylindrical depending portion 30 is provided. A pair of attachment ears 31 extends from either side of depending semi-cylindrical portion 30. The ears 31 have apertures therein to receive clamping bolts therethrough into threaded apertures 21a and 21b, FIG. 4, to secure guard member 28 to member 11.

Figures 7, 8:
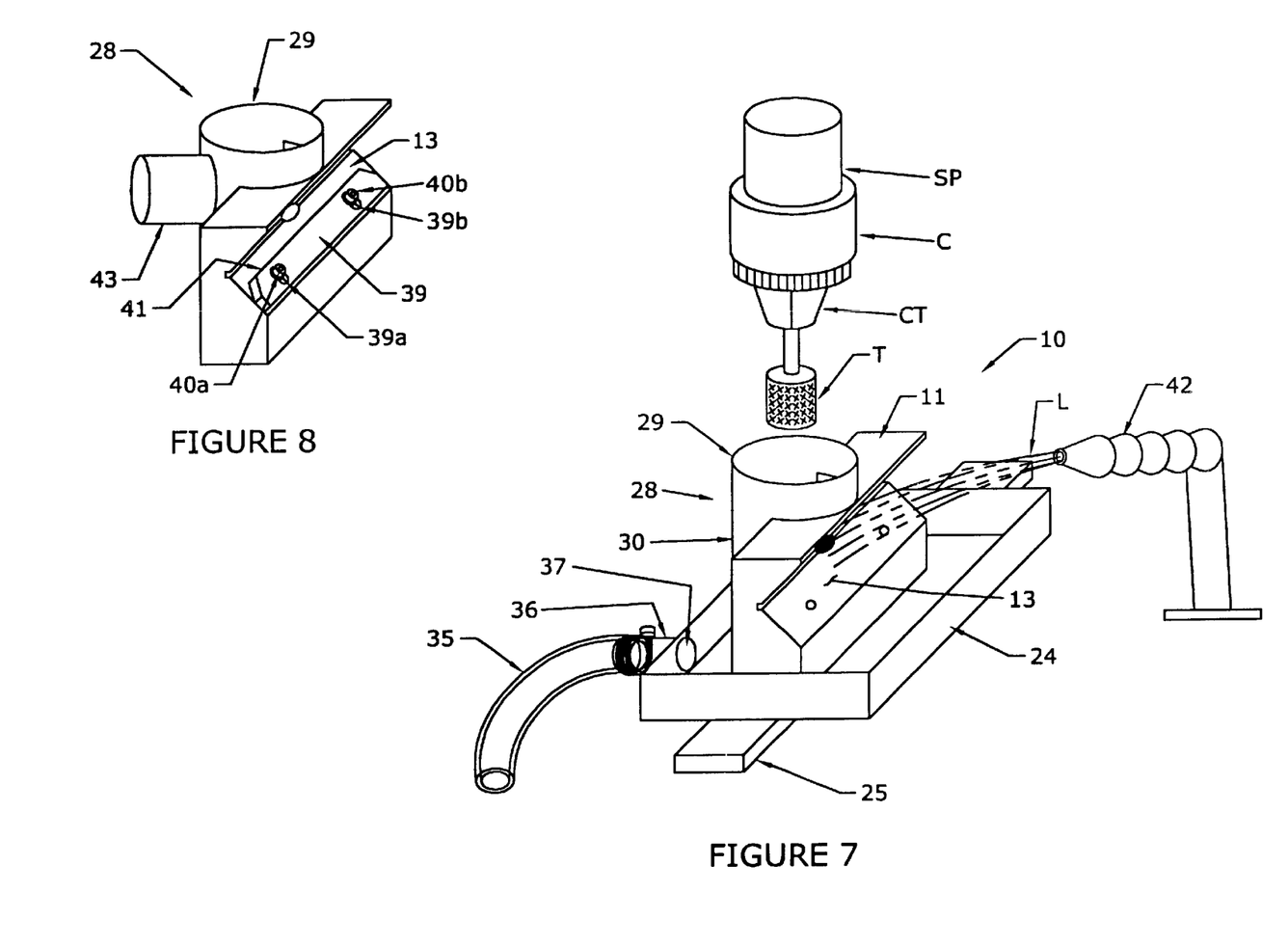
FIG. 7 is a perspective view of the fixture set-up as shown in FIG. 5 and further illustrating an application of the fixture for a metal cutting operation.
FIG. 8 is a perspective view of a fixture embodying the invention with an additional guide member for thin work pieces.

Guard member 28 encloses recess 15 and defines a passage thereto. Guard has a partial bottom floor 32 spaced (not shown) from surface S to permit lubricant to pass to tray 24. As shown in FIG. 7, fixture 10 is set up for use with a drill press or other machine with a vertically arranged cutting tool. A drill press is exemplified in broken line by a spindle SP, chuck C and collet CT. As shown in FIG. 5, a cutting tool T extends into passage 15 behind opening O. positioned to act on a work piece moved along guide surfaces 12 and 13 with a corner extending through opening 0.

In operation, the fixture 10 with tray 24 and element 25 affixed thereto are placed on the worktable of a drill press or a vertical milling machine. The cutting tool T is positioned in recess 15 within guard 28 to deburr, chamfer or bevel the corner of a work piece moved along guide surfaces 12 and 13. Clamping member 25 is then clamped to the worktable as by means of C-clamps or any other suitable clamping means. The set-up of FIGS. 5 and 7 is designed to work on a metal work piece and includes the cutting lubricant tray 24.

Reference is now made to FIG. 7. A cutting lubricant nozzle 42 is shown spraying lubricant on the cutting tool through opening O and also guide surfaces 12 and 13, which is picked up on a work piece. The lubricant is collected in tray 24, drains back to a reservoir (not shown) through a return line 35 clamped to a nipple 36 extending from an opening 37 in tray 24. The lubricant is filtered and re-circulated to nozzle 42 in a conventional metal cutting lubricant system.

FIG. 8 illustrates the addition of an auxiliary guide member 39 to the fixture 10. The work piece to be deburred, chamfered or beveled may be very thin. In such case a guide member 39 is secured to one of guide surfaces 12 or 13, guide surface 13 as shown, to provide support and an additional guide for such work piece. Guide 39 has two slots 39a and 39b defined therein, spaced apart the same distance apart as the two apertues 12a and 12b through guide surface 12 and the two apertures 13a and 13b through guide surface 13, shown in FIG. 1. Clamping bolts 40a and 40b are threadably received in apertures 13a and 13b through slots 39a and 39b, respectively. The top edge 41 of guide member is aligned with guide surface 12 a predetermined distance therefrom. Clamping bolts 38a secure guide member 37 to guide surface 13. The work piece is then moved past opening 0 using surface 12 and the upper edge 41 of guide member 39 as guides.

The guard member 28 as shown in FIG. 8 has a nozzle 43 extending therefrom as would be used in a wood working shop. The nozzle 43 is provided on guard member 28, which is used on fixtures set-up for wood working and plastic machining and is adapted to receive a hose from a vacuum source.

Figure 9:
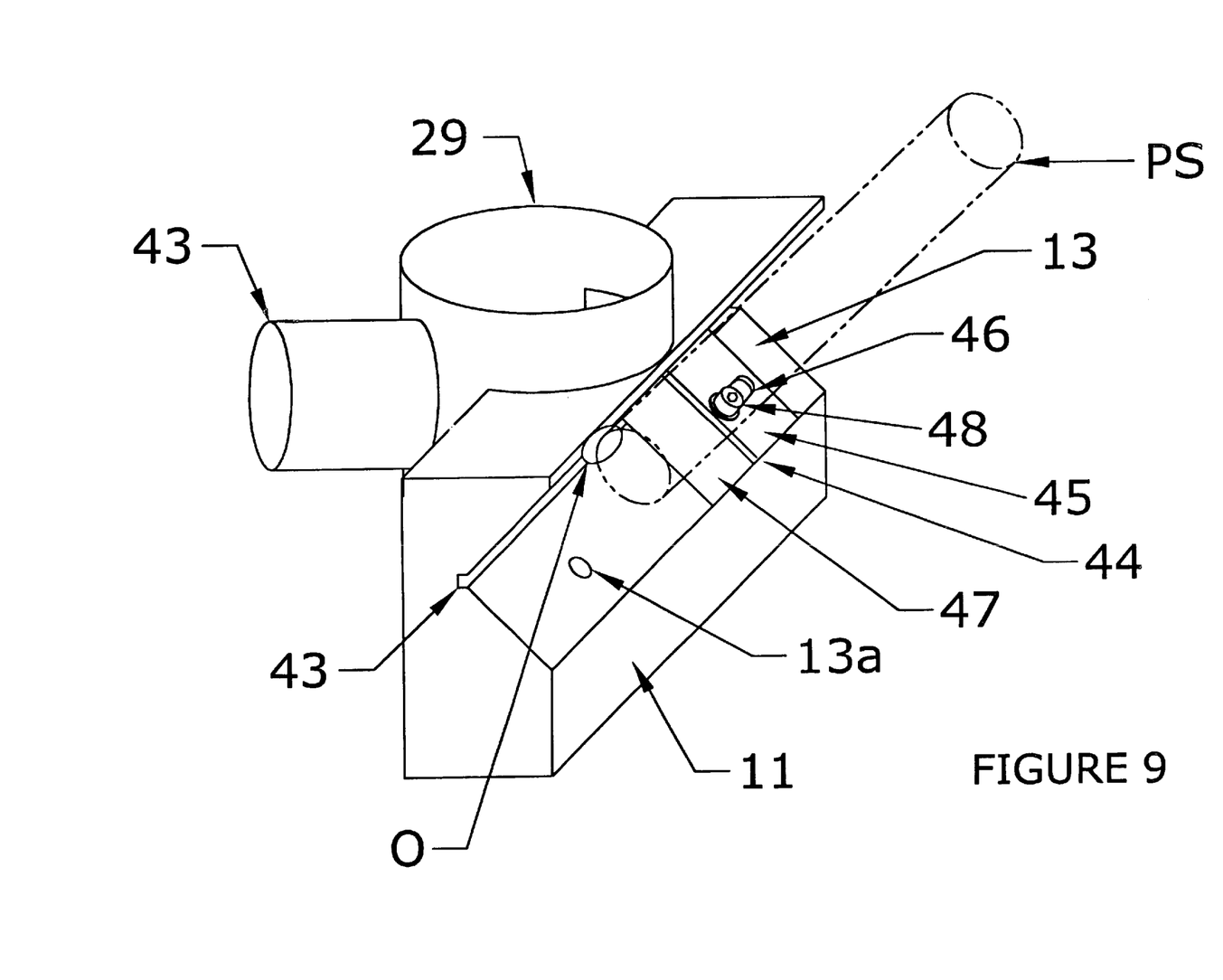
FIG. 9 is a perspective view of a fixture embodying the invention set up for working on the end of pipe.

FIG. 9 illustrates an additional accessory used with a fixture embodying the invention. A right angle positioning member 44 is provided having a first leg 45 with a longitudinal slot 46 therein and a second leg 47. Leg 45 is in contact with guide surface 13 and an edge of both legs is in contact with guide surface 12 to square leg 45 with guide surface 12. A clamping bolt 48 extends through slot 46 into aperture 13b to clamp member 44 in a predetermined position. This arrangement provides a fixture for deburring, chamfering or beveling the end of a section of pipe PS, shown in broken line. The positioning member 44 is positioned on guide surface 13 square with guide surface 12 in accordance with the diameter of the pipe PS and clamped by clamping bolt 48. The pipe PS is held in contact with guide surface 12 and second leg 47 and rotated by hand to deburr, chamfer or bevel the end of pipe PS.

The invention may also be embodied in an arrangement utilizing a router as the cutting tool as shown by the set-up 50 in FIGS. 10–14. A router R is mounted to a support member 51 that includes a base member 52 having feet 53 with a vertical support member 54 extending therefrom. The router base plate BP is secured to support member by a pair of spaced apart upper router upper clamp members 55 and a pair of lower router clamp members 56. Each of the clamp members comprises a column member 57, bolted to or otherwise secured to support plate 54, and having an extending arm 58. A cup point clamping bolt 59 is threadably received through each arm 58. Clamping bolts 59 secure the base plate BP to vertical support member.

Figure 10:
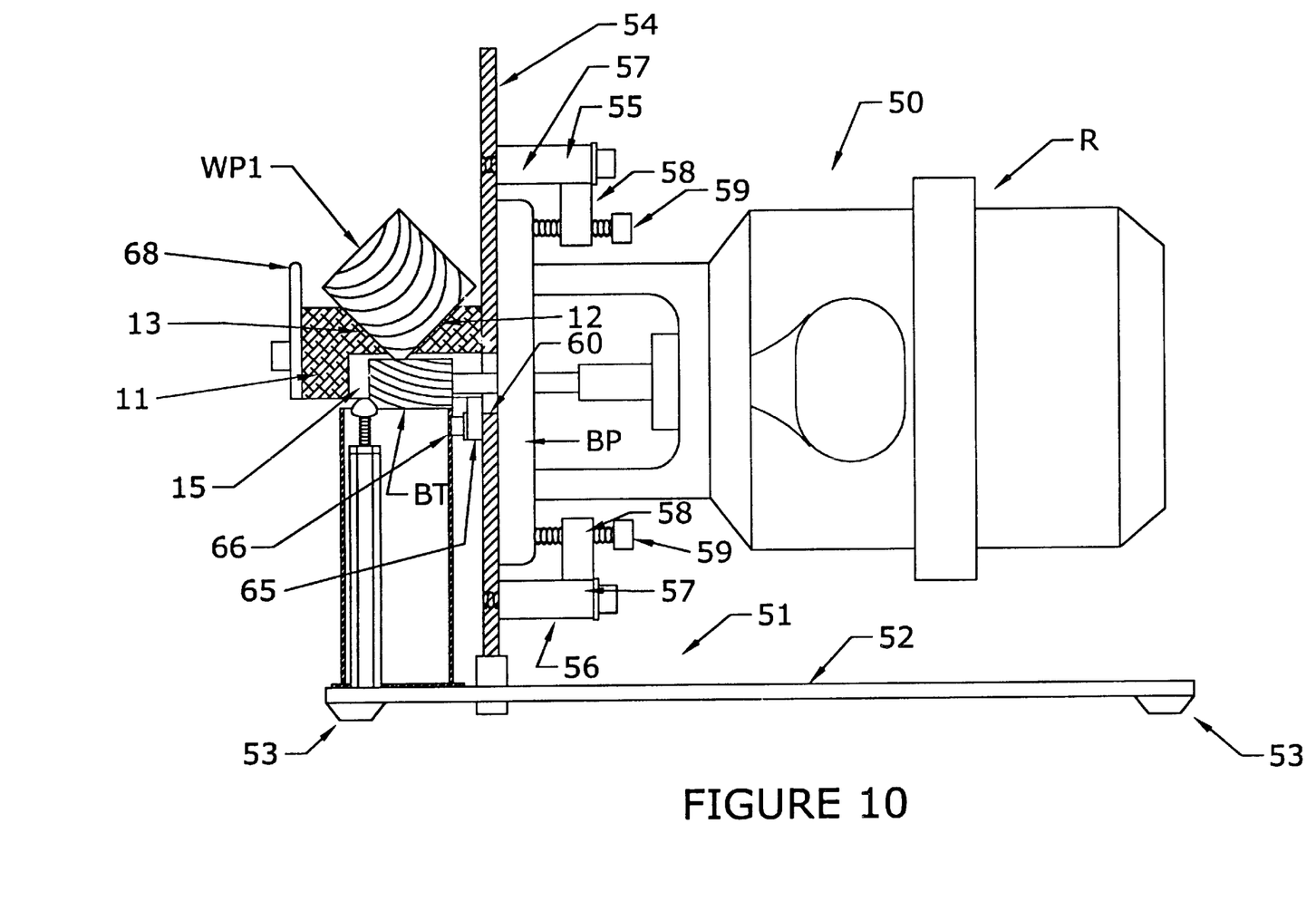
FIG. 10 is a side elevation of a fixture embodying the invention set up for use with a power tool having a cutting bit rotating in a horizontal cutting axis.
Figure 13:
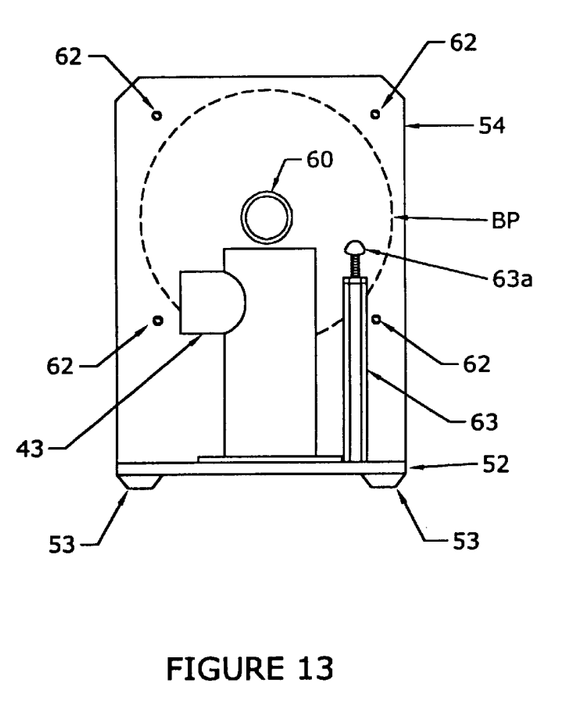
FIG. 13 is a view seen from the left of FIG. 10 with the fixture removed.

A member 11 is secured to the left of vertical support member 54 as seen in FIG. 10. The bit BT of router R extends through an opening 60 in vertical support member 54 into semi-cylindrical recess 15 of member 11. Reference is now made to FIG. 13. The threaded apertures which receive the securing bolts for column members 58 are identified by the reference numerals 62. A guard member 29 extends upwardly from base 52 and includes a nozzle 43 for connection to a vacuum source. Also shown in FIG. 13 is a support member 63, for member 11, extending upwardly from base 52 and having an extending set screw 63a for contacting member 11, for purposes hereinafter described.

Figure 11:
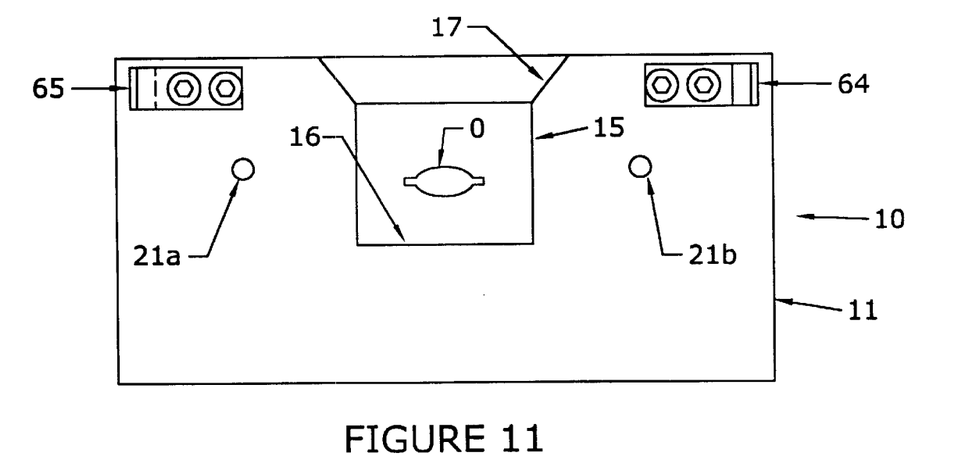
FIG. 11 a backside view of the fixture shown in FIG. 10 removed from the set-up of FIG. 10.
Figure 12:
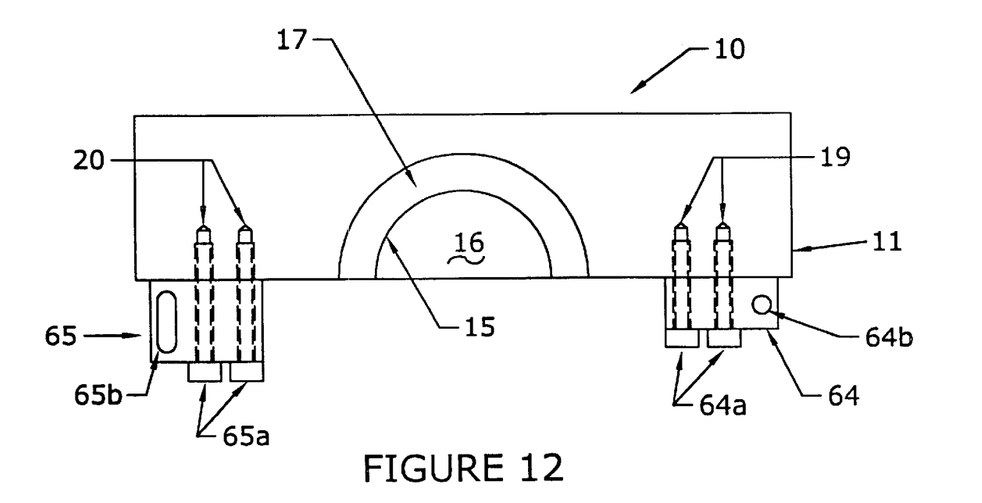
FIG. 12 is a top view of the fixture as seen in FIG. 11.
Figure 14:
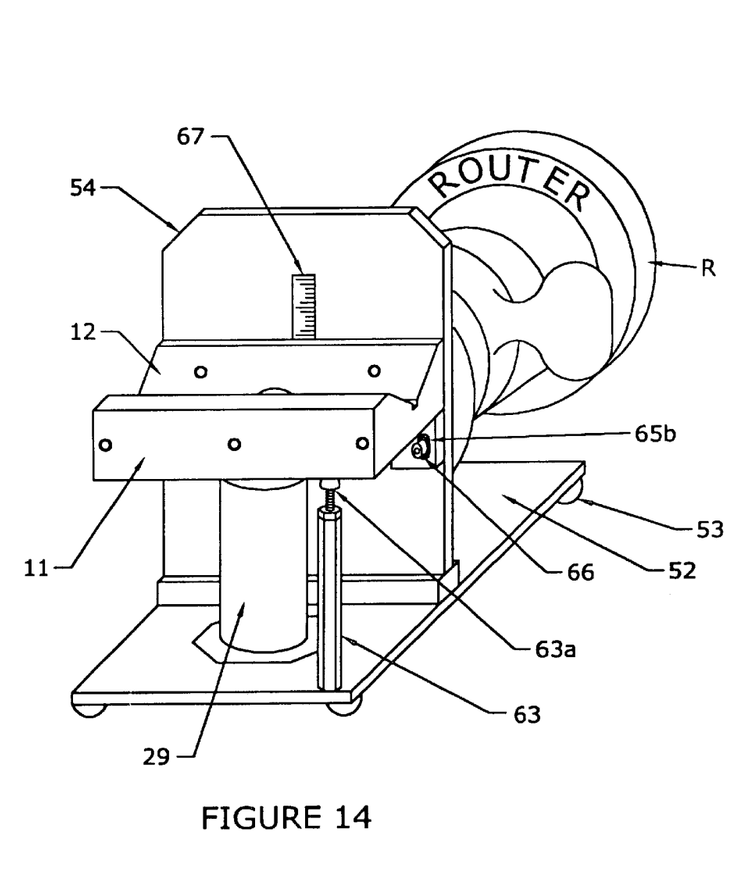
FIG. 14 is perspective view of the front perspective view of the set-up of FIG. 10, in perspective, seen predominantly from the left side of FIG. 10.

Reference is now made to FIGS. 11 and 12 to exemplify mounting brackets attached thereto. A first mounting bracket 64 is secured to member 11 by bolts 64a threaded into apertures 19. A second mounting bracket 65 is secured to member 11 by bolts 65a threaded into apertures 20. Bracket 64 also has an aperture 64b therethough to receive a clamping bolt (not shown) into vertical support member 54. This will provide a pivot for member 11. Bracket 65 has a slot 65b therein adapted to receive a clamping bolt 66 therethrough as shown in FIGS. 10 and 14. This arrangement permits member 11 to be pivoted about clamping bolt in aperture 64 and secured in a pivoted position by clamping bolt 66 extending through slot 65b. This will permit the depth of cut on the corner of a work piece to be varied. Support member 63, through adjustment of set bolt 63a therein, contacts member 11 and provides additional support therefor in any pivotal position. As shown in FIG. 14, a calibrated scale 67 is provided to assist an operator in setting a depth of cut.

A work piece support member 68, which is optional, may also be provided to provide support for a work piece of small thickness, such as a panel member. In such operation, an auxiliary guide member 39 as shown in FIG. 8 may be secured to guide surface 12. The upper edge of support member 68 resides in a continuation of the plane of guide surface 13.

To adjust a depth of cut, the clamping bolt through aperture 64b in bracket 64 is loosened as is bolt 66, member 11 is pivotally adjusted, set bolt 63a is adjusted to support member 11 in the desired position. Then the clamping bolt through aperture 64b and clamping bolt 66 are tightened and the fixture is ready for use.

It is apparent that an auxiliary guide member 39 may be utilized in the set-up of FIG. 10. Similarly, the guide member 44 for the ends of round stock as shown in FIG. 9 may be utilized in the set-up of FIG. 10.

Also the base member 52 may be positioned in and secured to a cutting lubricant retaining tray 24 as shown in FIG. 5.

A fixture embodying the invention is very versatile in being adaptable for use with a variety of cutting tools. A fixture embodying the invention is relatively inexpensive as compared to existing tools designed for the same function.

It may thus be seen that the objects of the invention set forth above as well as those made apparent are efficiently attained. While preferred embodiments of the invention have been set forth for purposes of disclosure, modifications to the disclosed embodiments as well as other embodiments of the invention may occur to those skilled in the art. Accordingly, the appended claims are intended to cover all modifications to the disclosed embodiments of the invention as well as other embodiments thereof which do not depart from the spirit and scope of the invention.

What is claimed is:

1. Apparatus for use with a rotary cutting tool to deburr, chamfer, or bevel edges of a work piece comprising a member having opposite sides, a recess defined in a first of said sides by two guide surfaces at a right angle to each other, the opposite side residing in a plane essentially perpendicular to a plane bisecting the angle between said surfaces, a semi-cylindrical recess defined in said member in said opposite side intermediate the ends thereof about an axis which is essentially perpendicular to a plane bisecting the angle between said surfaces, said semi-cylindrical recess forming a passage extending through a portion of said surfaces and defining an opening in said surfaces whereby a rectangular cross section work piece contacting said surfaces will extend through said opening into said passage, a guard member having a cylindrical upper portion and a semi-cylindrical depending lower portion affixed to said member essentially coaxial with said passage thereby closing said semi-cylindrical recess whereby a rotary cutting tool may be inserted in said semi-cylindrical recess to act on a work piece extending through said opening.

2. The apparatus of claim 1 wherein a nozzle extends from said lower portion of said guard member and provides communication to said semi-cylindrical recess for removal of material cut from the work piece.

3. The apparatus of claim 1 further including a base member affixed to said member and extending beyond said member at both ends thereof and providing means for securing said base member and said member to a work table.

4. The apparatus of claim 1 further including an auxiliary guide member adapted to be secured to one of said guide surfaces with an edge of said auxiliary guide member being a predetermined distance from the other guide surface.

5. The apparatus of claim 1 further including a guide member for guiding round stock, said guide member having perpendicular legs adapted to contact both of said guide surfaces and be secured in position in a predetermined relation to said opening.

6. Apparatus for use with a rotary cutting tool to deburr, chamfer, or bevel edges of a work piece comprising a member having opposite sides, a recess defined in a first of said sides by two guide surfaces at a right angle to each other, the opposite side residing in a plane essentially perpendicular to a plane bisecting the angle between said surfaces, a semi-cylindrical recess defined in said member in said opposite side intermediate the ends thereof about an axis which is essentially perpendicular to a plane bisecting the angle between said surfaces, said semi-cylindrical recess forming a passage extending through a portion of said surfaces and defining an opening in said surfaces whereby a rectangular cross section work piece contacting said surfaces will extend through said opening into said passage, a support member including an upright support plate, an aperture defined in said support plate, means for mounting a power tool to one side of said support plate with the rotary cutting tool extending through said aperture, means for mounting said member on the opposing side of said support plate so that said semi-cylindrical recess at least partially receives the cutting tool in a position so as to cut a work piece on said guide surfaces.

7. The apparatus of claim 6 where said member is pivotally mounted at one end thereof to said support plate and and further comprising a support column extending vertically from said support member and contacting said member.

8. The apparatus of claim 7 where said support column is height adjustable.

9. The apparatus of claim 6 further including an auxiliary guide member adapted to be secured to one of said guide surfaces with an edge of said auxiliary guide member being a predetermined distance from the other guide surface.

10. The apparatus of claim 6 further including a guide member for guiding round stock, said guide member having perpendicular legs adapted to contact both of said guide surfaces and be secured in position in a predetermined relation to said opening.

11. The apparatus of claim 6 where the power tool is a router having a base plate and the base plate is attachable to and removable from said upright support plate.

12. The apparatus of claim 11 wherein a plurality of clamping means are disposed on said upright support plate for clamping the base plate of the router thereto.

13. The apparatus of claim 6 further including a cylindrical guard member extending from said support member toward the rotary cutting tool to catch chips cut from a work piece and wherein a nozzle extends from a lower portion of said guard member and provides communication to said semi-cylindrical recess for removal of the chips cut from the work piece.

14. The apparatus of claim 13 wherein a nozzle extends from said lower portion of said guard member and provides communication to said semi-cylindrical recess for removal of the chips cut from the work piece, said nozzle adapted to be connected to a hose from a vacuum source.

15. Apparatus for use with a rotary cutting bit to deburr, chamfer, or bevel edges of a work piece comprising a member having opposite sides, a recess defined in a first of said sides by two guide surfaces at a right angle to each other, the opposite side residing in a plane essentially perpendicular to a plane bisecting the angle between said surfaces, a semi-cylindrical recess defined in said member in said opposite side intermediate the ends thereof about an axis which is essentially perpendicular to a plane bisecting the angle between said surfaces, said semi-cylindrical recess forming a passage extending through a portion of said surfaces and defining an opening in said surfaces whereby a rectangular cross section work piece contacting said surfaces will extend through said opening into said passage and means for removeably mounting said member in operative relation to the cutting bit of a power tool.

16. The apparatus of claim 15 further including an auxiliary guide member adapted to be secured to one of said guide surfaces with an edge of said auxiliary guide member being a predetermined distance from the other guide surface.

17. The apparatus of claim 15 further including a guide member for guiding round stock, said guide member having perpendicular legs adapted to contact both of said guide surfaces and be secured in position in a predetermined relation to said opening.

18. The apparatus of claim 15 further including a base member affixed to said member and extending beyond said member at both ends thereof and providing means for securing said base member and said member to a work table.

19. The apparatus of claim 15 further including a tray member for retaining a cutting lubricant applied to said guide surfaces, said member being positioned in and attached to said tray member.

20. The apparatus of claim 19 further including a base member affixed to said member and said tray member and extending beyond said tray member at both ends thereof and providing means for securing said base member and said member to a work table.

* * * * *